(12) United States Patent
Miller et al.

(10) Patent No.: US 9,007,025 B2
(45) Date of Patent: Apr. 14, 2015

(54) SYSTEMS AND METHODS FOR CONFIGURING AND CHARGING HYBRID BATTERY SYSTEMS

(75) Inventors: Bruce A. Miller, Plano, TX (US); Fu-Sheng Tsai, Northborough, MA (US)

(73) Assignee: Dell Products, L.P., Round Rock, TX (US)

( * ) Notice: Subject to any disclaimer, the term of this patent is extended or adjusted under 35 U.S.C. 154(b) by 1086 days.

(21) Appl. No.: 12/798,566

(22) Filed: Apr. 7, 2010

(65) Prior Publication Data

US 2011/0248681 A1   Oct. 13, 2011

(51) Int. Cl.
*H02J 7/00* (2006.01)

(52) U.S. Cl.
CPC .................... *H02J 7/0018* (2013.01)

(58) Field of Classification Search
USPC ........................................ 320/116, 124, 126
See application file for complete search history.

(56) References Cited

U.S. PATENT DOCUMENTS

| | | | |
|---|---|---|---|
| 5,717,307 A * | 2/1998 | Barkat et al. | 340/636.1 |
| 5,726,554 A * | 3/1998 | Freiman et al. | 320/157 |
| 6,262,562 B1 * | 7/2001 | Cummings et al. | 320/116 |
| 6,275,006 B1 | 8/2001 | Koike et al. | |
| 6,329,789 B1 | 12/2001 | Gavrilov et al. | |
| 6,329,790 B1 | 12/2001 | Rahimi | |
| 6,333,619 B1 | 12/2001 | Chavez et al. | |
| 6,337,560 B1 | 1/2002 | Kalogeropoulos et al. | |
| 6,342,774 B1 | 1/2002 | Kreisinger et al. | |
| 6,424,120 B1 | 7/2002 | Chen | |
| 6,459,237 B1 | 10/2002 | Bausch | |
| 6,459,238 B2 | 10/2002 | Minamiura et al. | |
| 6,522,102 B1 | 2/2003 | Cheiky et al. | |
| 6,552,514 B2 | 4/2003 | Yang | |
| 6,621,248 B1 | 9/2003 | Li | |
| 6,657,415 B2 | 12/2003 | Saeki et al. | |
| 6,674,265 B2 | 1/2004 | Yoshida et al. | |
| 6,700,351 B2 | 3/2004 | Blair et al. | |
| 6,756,767 B2 | 6/2004 | Kawai | |
| 6,771,046 B2 | 8/2004 | Ariga et al. | |
| 6,777,913 B2 | 8/2004 | You | |
| 6,781,348 B2 | 8/2004 | Yokohama | |
| 6,823,274 B2 | 11/2004 | Zimmerman et al. | |
| 6,917,184 B2 | 7/2005 | Lai et al. | |

(Continued)

OTHER PUBLICATIONS

Batteries and electrochemical Capacitors, Daniel Scherson and Attila Palencsar, Spring 2006,The Electrochemical Society Interface pp. 17-22.*

(Continued)

*Primary Examiner* — Drew A Dunn
*Assistant Examiner* — Steve T Chung
(74) *Attorney, Agent, or Firm* — Egan, Peterman, & Enders LLP.

(57) ABSTRACT

Systems and methods for simultaneously charging two or more cell strings of a hybrid battery system from a shared input current path to the battery system. An input common charging current may be limited to the smallest maximum allowable charging current value of multiple battery cell strings of a hybrid battery system, or may be provided as the greater of the maximum allowable charging currents of multiple battery cell strings of a hybrid battery system with current supplied to individual cell strings that require less than the maximum current being individually controlled so as not to exceed the maximum allowable current for each of the individual cell strings of the hybrid battery system.

20 Claims, 5 Drawing Sheets

(56) References Cited

U.S. PATENT DOCUMENTS

| | | |
|---|---|---|
| 6,949,910 B2 | 9/2005 | Chen |
| 7,003,679 B1 | 2/2006 | Kesea et al. |
| 7,009,350 B1 | 3/2006 | Gold |
| 7,071,652 B2 | 7/2006 | Chen |
| 7,135,837 B2 | 11/2006 | Patino |
| 7,321,219 B2 | 1/2008 | Meyer et al. |
| 7,345,455 B2 | 3/2008 | Jones |
| RE40,223 E | 4/2008 | Koike et al. |
| 7,372,235 B2 | 5/2008 | Mori et al. |
| 7,375,495 B2 | 5/2008 | Richter et al. |
| 7,378,819 B2 | 5/2008 | Wang et al. |
| 7,391,183 B2 | 6/2008 | Ariga et al. |
| 7,391,184 B2 | 6/2008 | Luo et al. |
| 7,414,381 B2 * | 8/2008 | Popescu-Stanesti et al. . 320/126 |
| 7,489,109 B1 | 2/2009 | Qian et al. |
| 7,498,769 B1 | 3/2009 | Potanin et al. |
| 7,498,770 B1 | 3/2009 | Caldwell |
| 7,501,795 B2 | 3/2009 | Bertness et al. |
| 8,198,856 B2 * | 6/2012 | Koide et al. .............. 320/106 |
| 2005/0001593 A1 | 1/2005 | Kawasumi et al. |
| 2008/0048608 A1 * | 2/2008 | Lim et al. ................. 320/106 |
| 2008/0084179 A1 * | 4/2008 | Emori et al. .............. 320/109 |
| 2008/0106234 A1 * | 5/2008 | Yun ........................... 320/124 |
| 2008/0238358 A1 * | 10/2008 | Koide et al. .............. 320/106 |
| 2009/0045775 A1 * | 2/2009 | Popescu Stanesti et al. . 320/126 |

OTHER PUBLICATIONS

Wang et al, "Activating an Information Handling System Battery From a Ship Mode", U.S. Appl. No. 12/253,829, filed Oct. 17, 2008, 27 pgs.

* cited by examiner

SYSTEMS AND METHODS FOR CONFIGURING AND CHARGING HYBRID BATTERY SYSTEMS

FIELD OF THE INVENTION

This invention relates generally to battery systems, and more particularly to charging of battery systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Examples of portable information handling systems include notebook computers. These portable electronic devices are typically powered by rechargeable battery pack systems such as lithium ion ("Li-ion") or nickel metal hydride ("NiMH") battery packs. The rechargeable battery packs generally include multiple battery cells connected in serial and/or parallel configuration. A "string" consists of battery cells which may be connected in this series/parallel configuration. Two or more separate sets or "strings" of such cells may be provided in a single "hybrid" battery pack to power an information handling system. Each of these separate battery cell strings may sometimes have different physical characteristics, charge capacity, and/or impedance. Such a combination of different battery cell strings may be desirable, for example, to meet space requirements or the physical configuration of a portable information handling system. For example, in pursuit of longer battery run time of notebook computers the ability to package the maximum battery energy capacity into a given irregular volume is critical. This often involves using different types of battery cells in a hybrid battery pack due to different z height constraints, e.g., using both cylindrical and polymer batteries to maximize the pack capacity in a restricted volume. It is expected that the use of hybrid packs will increase significantly due to the profile (height) challenge and the continuous push for higher battery capacities.

Due to the different impedances and capacities, the traditional approach is to design a hybrid battery pack which has two separate battery packs inside, all being reported to the system as a single battery pack. However, due to the difference in impedance and capacity of the cell strings, the status of the cells in each cell string and the distribution of charging currents are usually different and are controlled as if each string is a separate battery. If the charging current into a cell string exceeds an allowable rate the life requirement for the cell string may be compromised.

Figure 1:
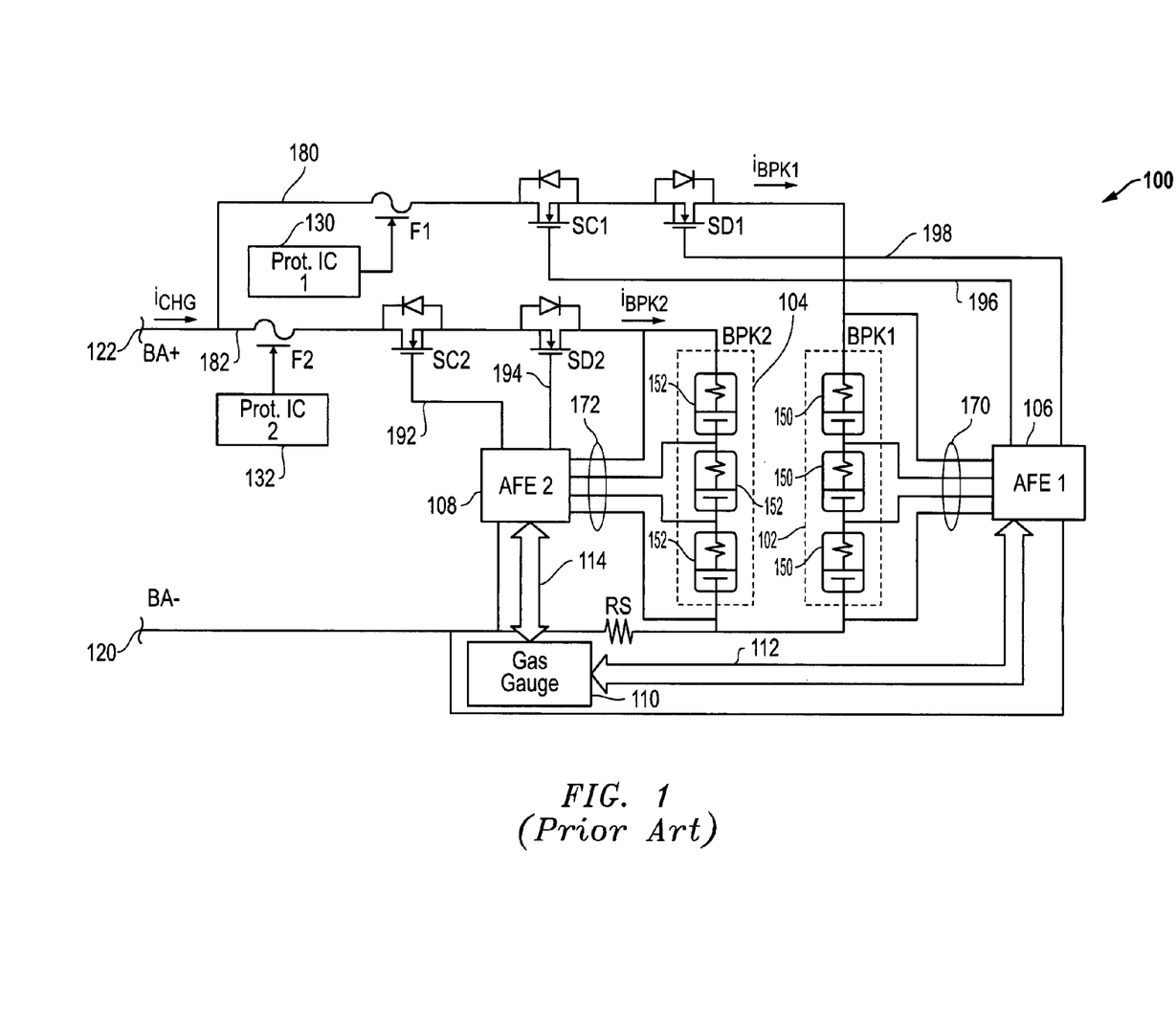
FIG. 1 illustrates a prior art configuration of a hybrid battery pack

FIG. 1 illustrates an example of a prior art configuration of a hybrid battery pack 100 having two battery cell strings 102 and 104 of different capacity and/or impedance characteristics that are coupled together in parallel between battery system terminals 120 and 122 as shown. In the configuration of FIG. 1, each of battery cell strings 102 and 104 are treated as separate battery packs that are coupled between battery system terminals 120 and 122 by separate current paths 180 and 182, respectively. As shown, battery cell string 102 is made up of multiple serially-coupled battery cells 150, and battery cell string 104 is made up of multiple serially-coupled battery cells 152. A respective analog front end ("AFE") 106 or 108 is coupled to a respective one of battery strings 102 or 104 by voltage monitoring lines 170 or 172 to allow battery management unit ("BMU") microcontroller or gas gauge 110 to monitor voltage of individual battery cells of each of battery strings 102 and 104 by data paths 112 or 114 as shown.

Still referring to FIG. 1, each of separate current paths 180 and 182 is provided with separate charge/discharge control circuitry that includes two field effect transistors ("FETs") SC1 and SD1 or SC2 and SD2 that are coupled in series between battery system terminal 122 and a respective battery cell string 102 or 104 as shown. Each charge FET (SC1 or SC2) is a switching element that forms a part of a separate charge circuit that is controlled by BMU 110 through a respective AFE 106 or 108 and control path 196 or 192 to allow or disallow charging current to a respective coupled battery cell string 102 or 104. Similarly, each discharge FET (SD1 or SD2) is a switching element that forms a part of discharge circuit that is controlled by BMU 110 through a respective AFE 106 or 108 and control path 198 or 194 to allow or disallow discharge current from a respective coupled battery cell string 102 or 104. Parasitic diodes are present across the source and drain of each FET switching element, i.e., to conduct charging current to the battery cell strings 102 or 104 when the respective discharge FET switching element SD-1 or SD-2 is open, and to conduct discharging current from the battery cell strings 102 or 104 when the respective charge FET switching element SC1 or SC2 is open. Also shown in FIG. 1 is protective fuse circuitry F1 or F2 that is provided for respective current paths 180 and 182, with fuse controller circuitry 130 and 132 provided to control operation of fuse circuitry F1 and F2, respectively, i.e., to disconnect battery cell strings 102 or 104 from battery system terminal 122 in the event of overcharging.

During constant current charging phase of the charging, a constant charge current $I_{CHG}$ is applied to battery system terminal 122 and a corresponding appropriate battery cell string charge current $I_{BPK1}$ or $I_{BPK2}$ is supplied to only one of battery cell strings 102 or 104 at a time in sequential fashion. In this way, the amount of charge current that is supplied to each of battery cell strings 102 or 104 during constant current (CC) charging operations may be maintained within the desired charge current range. Charge FETs SC1 and SC2 are used to control which battery cell string 102 or 104 is being charged at a given time. In some cases, battery cell strings 102 or 104 may be charged simultaneously together during constant voltage (CV) charging operations after constant current charging operations are complete.

SUMMARY OF THE INVENTION

Disclosed herein are systems and methods for configuring and charging hybrid battery systems, e.g., for information handling systems such as notebook computers. The disclosed systems and methods may be advantageously implemented to avoid the shortcomings of conventional hybrid battery systems, e.g., such as the need for duplicate protective and control circuits which increases system cost, and a charge time which is double that of a normal battery and thus degrades the user experience.

In one respect, disclosed herein is a method of charging a hybrid battery system, including: providing a hybrid battery system including at least two battery system terminals and two or more battery cell strings coupled together in parallel between the battery system terminals with a shared input current path, the battery cell strings having at least one of different capacity or different impedance characteristics relative to each other and different values of maximum allowable charging current relative to each other; and applying a charging current to the battery system terminals to simultaneously charge the two or more battery cell strings with respective individual battery cell string currents that do not exceed the maximum allowable charging current for either of the two or more battery cell strings.

In another respect, disclosed herein is an information handling system, including a replaceable hybrid battery pack system. The hybrid battery pack system may include: at least two battery system terminals, and two or more battery cell strings coupled together in parallel between the battery system terminals with a shared input current path configured to receive a charging current applied to the hybrid battery system, the battery cell strings having at least one of different capacity or different impedance characteristics relative to each other and different values of maximum allowable charging current relative to each other. The two or more battery cell strings may be coupled together in parallel between the battery system terminals by the shared input current path to allow the two or more battery cell strings to be charged simultaneously from a received charging current at respective individual battery cell string currents that do not exceed the maximum allowable charging current for either of the two or more battery cell strings. The hybrid battery pack system may also include: system side electrical power terminals removably coupled to the battery system terminals to allow current to be interchanged between the two or more battery cell strings and other system components of the information handling system; a system load coupled to the system side electrical power terminals to receive current from the two or more battery cell strings of the battery system; and battery charger circuitry coupled to the system side electrical power terminals to provide the charging current to the two or more battery cell strings of the battery system.

In another respect, disclosed herein is a hybrid battery system, including: at least two battery system terminals; two or more battery cell strings coupled together in parallel between the battery system terminals with a shared input current path configured to receive a charging current applied to the hybrid battery system, the battery cell strings having at least one of different capacity or different impedance characteristics relative to each other and different values of maximum allowable charging current relative to each other. The two or more battery cell strings may be coupled together in parallel between the battery system terminals by the shared input current path to allow the two or more battery cell strings to be charged simultaneously from a received charging current at respective individual battery cell string currents that do not exceed the maximum allowable charging current for either of the two or more battery cell strings.

DESCRIPTION OF ILLUSTRATIVE EMBODIMENTS

Figure 2:
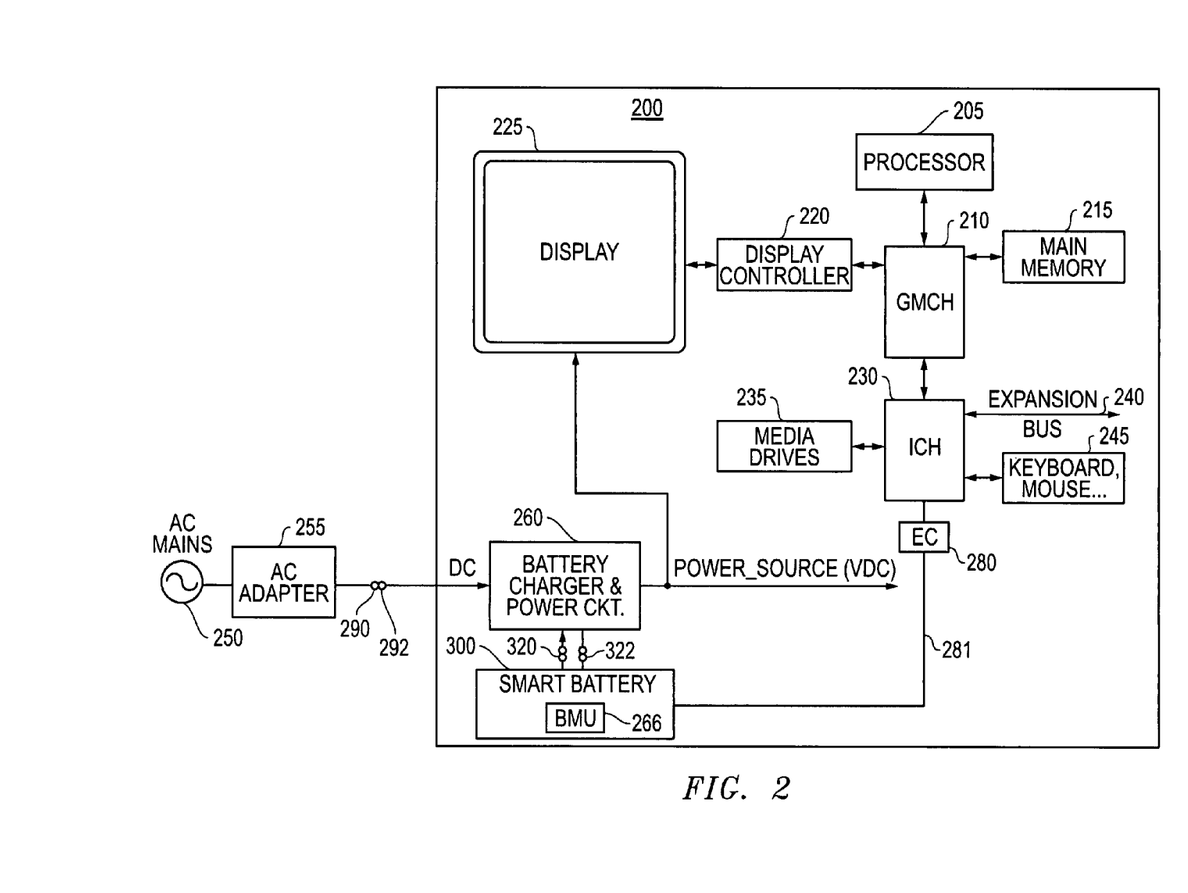
FIG. 2 is a block diagram of an information handling system according to one exemplary embodiment of the disclosed systems and methods.

FIG. 2 is a block diagram of an information handling system 200 (e.g., portable information handling system such as notebook computer, MP3 player, personal data assistant (PDA), cell phone, cordless phone, etc.) as it may be configured according to one exemplary embodiment of the disclosed systems and methods. As shown in FIG. 2, information handling system 200 of this exemplary embodiment includes a processor 205 such as an Intel Pentium series processor, an Advanced Micro Devices (AMD) processor or one of many other processors currently available. A graphics/memory controller hub (GMCH) chip 210 is coupled to processor 205 to facilitate memory and display functions. System memory 215 and a display controller 220 are coupled to GMCH 210. A display device 225 (e.g., video monitor) may be coupled to display controller 220 to provide visual images (e.g., via graphical user interface) to the user. An I/O controller hub (ICH) chip 230 is coupled to GMCH chip 210 to facilitate input/output functions for the information handling system. Media drives 235 are coupled to ICH chip 230 to provide permanent storage to the information handling system. An expansion bus 240 is coupled to ICH chip 230 to provide the information handling system with additional plug-in functionality. Expansion bus 240 may be a PCI bus, PCI Express bus, SATA bus, USB or virtually any other expansion bus. Input devices 245 such as a keyboard and mouse are coupled to ICH chip 230 to enable the user to interact with the information handling system. An embedded controller (EC) 280 running system BIOS is also coupled to ICH chip 230.

In this particular embodiment, information handling system 200 is coupled to an external source of AC power, namely AC mains 250 and AC adapter 255. As shown AC adapter 255 is removably coupled to, and separable from, battery charger/power circuit 260 of information handling system 200 at mating interconnection terminals 290 and 292 in order to provide information handling system 200 with a source of DC power to supplement DC power provided by battery cells of a hybrid battery system in the form of smart battery pack 300, e.g., lithium ion ("Li-ion") or nickel metal hydride ("NiMH") battery pack including multiple rechargeable batteries and battery system control logic in the form of battery management unit (BMU) circuitry that includes analog front end ("AFE") circuitry and microcontroller. Smart battery pack 300 is coupled to battery charger/power circuit 260 as shown by battery pack terminals 320 and 322. Further, a battery system data bus (SMBus) 281 is coupled to smart battery pack 300 to provide battery state information, such as battery voltage and current information, from BMU circuitry 266 of smart battery pack 300 to EC 280. Battery charger/power circuit 260 of information handling system 200 may also provide DC power for recharging battery cells of the battery system 300 during charging operations.

When a battery system is provided as a replaceable battery pack, it may be configured for insertion and removal from a corresponding battery pack compartment defined within the chassis of an information handling system (e.g., such as a notebook computer), and may be provided with external power and data connector terminals for contacting and making interconnection with mating power connector terminals and data connector terminals provided within the battery pack compartment to provide power to the system load of the information handling system and to exchange data with one or more processing devices of the information handling system. The system load of the information handling system includes any component therein that required electrical power to function, e.g., display 225, display controller 220, processor 205, media drives 235, system memory 215, ICH chip 230, GMCH chip 210, input devices 245, etc.

Figure 3:
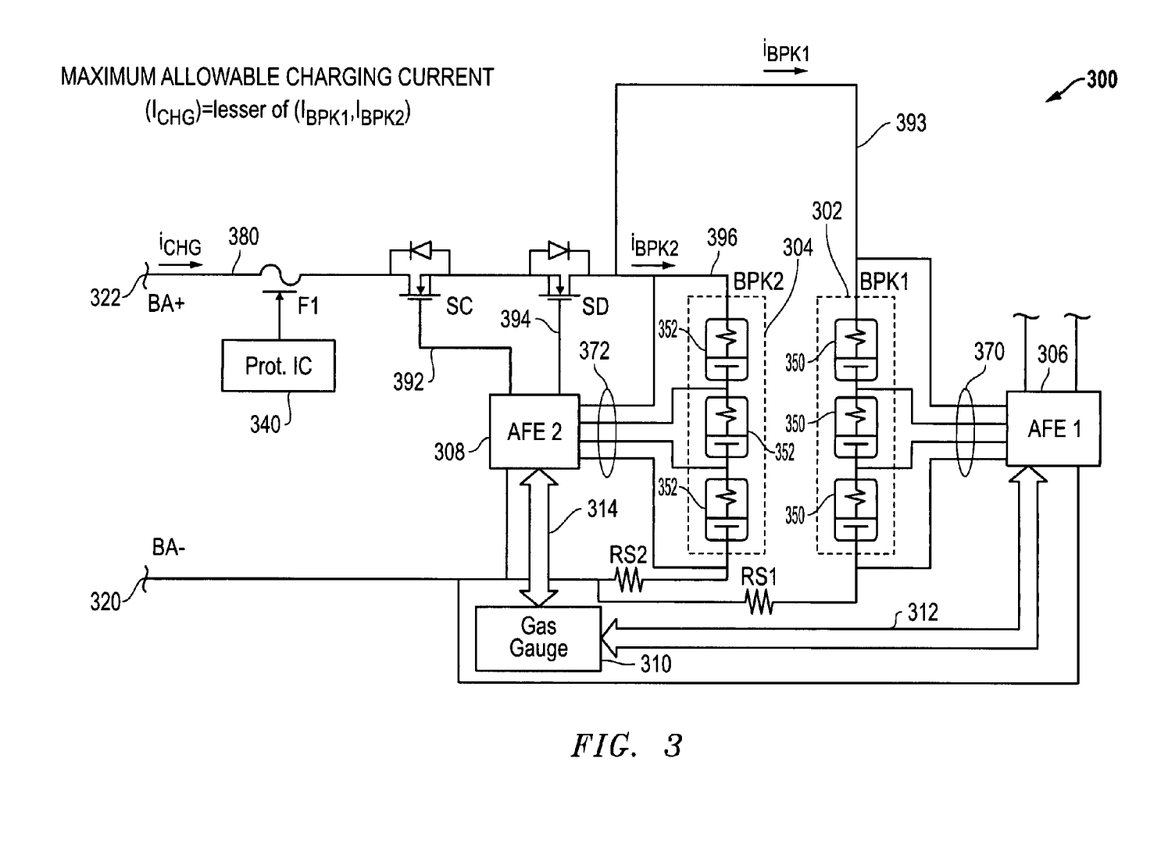
FIG. 3 illustrates a hybrid smart battery pack system according to one exemplary embodiment of the disclosed systems and methods.

FIG. 3 illustrates a hybrid smart battery pack system 300 according to one exemplary embodiment. As shown battery pack 300 includes battery system terminals 320 and 322 that are configured to be removably coupled to system side electrical power terminals of an information handling system such as information handling system 200 of FIG. 2, to allow current to be interchanged between smart battery pack 300 and other system components of information handling system 200, and to allow a user to remove and replace or interchange battery pack system 300 with another battery pack having battery system terminals that are similarly configured to be removably coupled to system side electrical power terminals of the information handling system. As shown, battery pack 300 includes two battery cell strings 302 and 304 of different capacity and impedance characteristics that are coupled together in parallel between battery system terminals 320 and 322 by a shared current path 380 as shown. Although a removable battery pack is illustrated, it will be understood that the disclosed systems and methods may alternatively be implemented in another embodiment with non-removable batteries/battery pack/s. It will be further understood that battery cell strings may be provided that coupled together in any suitable cell configuration besides that illustrated, e.g., in parallel or in series-parallel configuration.

In the embodiment of FIG. 3, each of battery cell strings 302 and 304 share the same current path 380, charge FET SC, discharge FET SD, and protective fuse 340. A separate branch current path 393 or 396 is present to supply current to a respective one of cell strings 302 or 304. As shown, battery cell string 302 is made up of multiple serially-coupled battery cells 350, and battery cell string 304 is made up of multiple serially-coupled battery cells 352. Although each of battery cell strings 302 and 304 are shown having three serially-coupled battery cells, it will be understood that the number of serially-coupled battery cells within a given battery cell string may be greater or less than three and/or that cells within a given battery cell string may alternatively be provided in parallel blocks of multiple cells. Moreover, it is possible that a given battery pack system 300 may have more than two battery cell strings. A respective analog front end ("AFE") 306 or 308 is coupled to a respective one of battery strings 302 or 304 by voltage monitoring lines 370 or 372 to allow battery management unit ("BMU") microcontroller or gas gauge 310 to monitor voltage of individual battery cells of each of battery strings 302 and 304 via data paths 312 or 314 as shown. Each of AFEs 306 and 308 may include, for example, cell voltage detect circuitry, current sensor circuitry, analog to digital conversion circuitry, etc.

Still referring to FIG. 3, shared current path 380 is provided with common charge/discharge control circuitry that includes switching elements in the form of field effect transistors ("FETs") SC and SD that are coupled in series between battery system terminal 322 and each of battery cell strings 302 and 304 as shown. In this embodiment, charge/discharge control circuitry is only provided in the shared current path 380 and no charge/discharge control circuitry is provided in the separate current path of any of the two or more battery cell strings 302 or 304. Charge FET (SC) is a switching element that forms a part of a separate charge circuit that is controlled by BMU 310 through AFE 308 and control path 392 to allow or disallow charging current iCHG to a battery cell strings 302 and 304. Similarly, discharge FET (SD) is a switching element that forms a part of discharge circuit that is controlled by BMU 310 through AFE 308 and control path 394 to allow or disallow discharge current from battery cell strings 302 and 304. Parasitic diodes are present across the source and drain of each FET switching element, i.e., to conduct charging current to the battery cell strings 302 and 304 when the discharge FET switching element SD is open, and to conduct discharging current from the battery cell strings 302 and 304 when the charge FET switching element SC is open. Also shown in FIG. 3 is common protective fuse circuitry F1 that is provided for shared current path 380, with fuse controller circuitry 340 provided to control operation of fuse circuitry F1, e.g., to disconnect battery cell strings 302 and 304 from battery system terminal 322 in the event of overcharging. It will be understood that any other suitable type of protective circuitry besides fuse circuitry may be employed in other embodiments.

With regard to the embodiments herein, BMU 310 of the battery control logic may be present for monitoring battery system operation (e.g., monitoring voltage, current, temperature, etc.) and for controlling battery current control circuitry that includes charge and discharge FETs SC and SD, although any other suitable configuration of circuitry, controller/s, processor/s and/or control logic may be employed in other embodiments. Current sense resistors RS1 and RS2 may be present to allow BMU 310 to monitor charging current to the respective cell strings 302 and 304, and inline fuse F1 may be present to prevent over-charging. BMU 310 may also be coupled to monitor voltage of battery cell/s 350 and 352 through AFE circuitry 306 and 308. Further information on BMU, battery pack system circuitry and battery charging operations may be found in U.S. Pat. Nos. 7,378,819, 7,391,184, and U.S. patent application Ser. No. 12/253,829 filed Oct. 17, 2008, each of which is incorporated herein by reference in its entirety. It will be understood that charge/discharge control circuitry of battery pack system 300 may include any other number and/or type of charge and discharge switching elements suitable for performing the current control tasks described herein. Examples of other types of suitable switching elements include, but are not limited to, bipolar junction transistors (BJTs).

Due to the difference in impedance and capacity of the cell strings 302 and 304, the status of the individual cells 350 and 352 in each respective cell string 302 and 304 and the distribution of individual cell string charging currents (iBPK1, iBPK2) are usually different and not controlled in this exemplary embodiment. Additionally, the maximum allowable charging currents (IBPK1 for cell string 302 and IBPK2 for cell string 304) are different for each of cell strings 302 and 304 since the electrical characteristics of these two cell strings are different. In this regard, maximum allowable charging currents IBPK1 and IBPK2 are pre-determined based on the design of the individual cells and the series parallel configuration of the cell string. To prevent the charging current into either one of cell string 302 or 304 from exceeding its maximum allowable charging rate and thus compromising or shortening the life of the individual cell string, the charging current iCHG provided through shared current path 380 into battery pack system 300 (e.g., during constant current charging operation for lithium ion battery cells) is limited in this exemplary embodiment to the smaller of the two maximum allowable charging current values, IBPK1 or IBPK2, of the respective cell strings 302 and 304. This ensures that the charging current into each of cell strings 302 and 304 remains below the maximum allowable charging current.

In the exemplary embodiment of FIG. 3, the constant current charging period ends when the voltage of the cell strings reaches a pre-determined minimum level, at which time a constant voltage (or voltage controlled charging period) may start. Although battery system 300 charges at a slower rate during the constant current charging period, the constant current charging phase of cell strings 302 and 304 is combined in this embodiment to reduce the overall user-perceived charge time. Advantages of the methodology and circuit configuration of this embodiment include lower cost (e.g., fewer FETs, fuses, etc.), simpler control, and shorter charge time. As further illustrated in FIG. 3, separate current sensing resistors RS1 and RS2 may be optionally provided in the respective current paths of cell strings 302 and 304 to provide additional capability of detecting faulty currents and initiating proper measures if any of the cells of cell strings 302 and 304 should fail.

Figure 4:
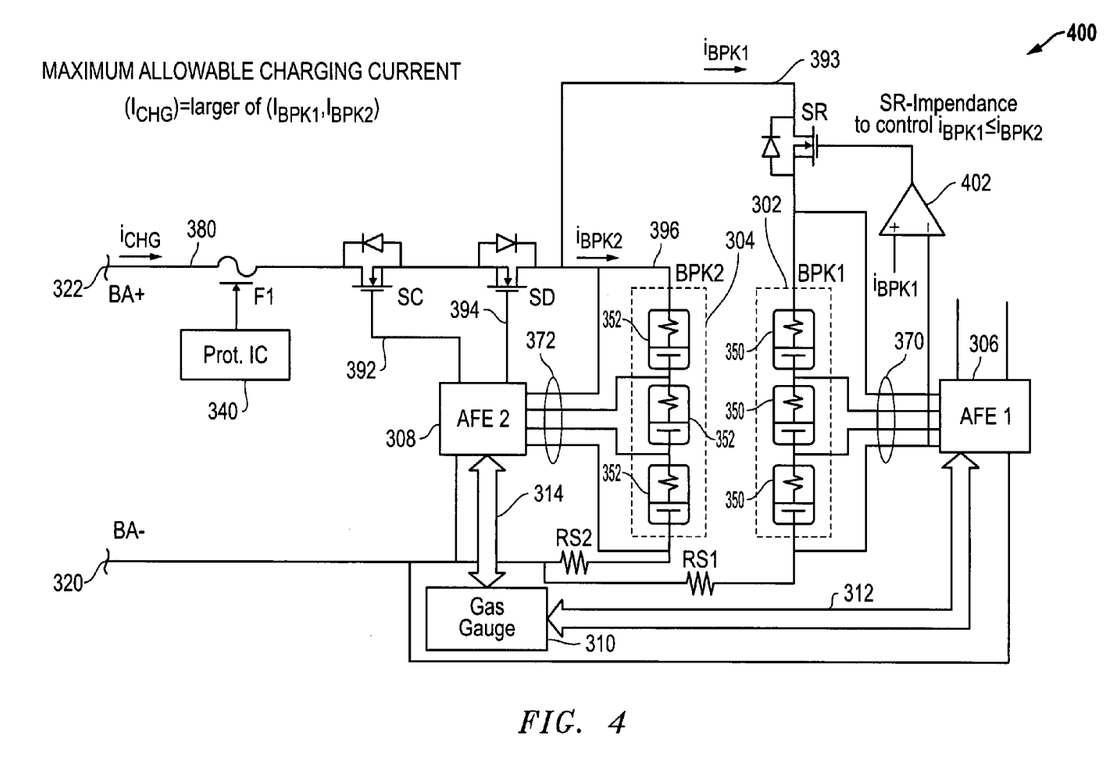
FIG. 4 illustrates a hybrid smart battery pack system according to one exemplary embodiment of the disclosed systems and methods.

FIG. 4 illustrates another exemplary embodiment of a hybrid battery pack system 400 in which the charging current iCHG of the battery pack system may be controlled (e.g., during constant current charging operation) to the greater of the maximum allowable charging currents (IBPK1 or IBPK2) of two cell strings of different charge capacity and impedance characteristics. As shown, battery pack system 400 includes two cell strings 304 and 305 that are coupled together in parallel between battery system terminals 320 and 322 by a shared current path 380 in a manner similar to that of the embodiment of FIG. 3. However, in this embodiment, charging current iCHG provided through shared current path 380 is controlled to be the greater of IBPK1 or IBPK2 (e.g., to be IBPK2 when IBPK2 is greater than IBPK1, or to be IBPK1 when IBPK1 is greater than IBPK2).

In the embodiment of FIG. 4, a series impedance element in the form of series FET SR is present in the branch current path 393 to cell string 304 for purposes of controlling the cell string charging current iBPK1 provided to cell string 302. For example, if the cell string charging current iBPK1 provided at any given time to cell string 302 is less than or equal to maximum allowable charging current IBPK1 for cell string 302, then series FET SR is controlled to be fully on and to present minimal series impedance. However, if the charging current iBPK1 provided to cell string 302 increases beyond IBPK1, then SR is controlled as necessary to increase impedance in SR to limit the charging current at or below maximum allowable charging current IBPKI of cell string 302. In this fashion, both charging currents iBPK1 and iBPK2 into the respective cell strings 302 and 304 may be maximized without exceeding the respective maximum allowable charging current IBPK1 or IBPK2 for the individual cell strings 302 and 304. Advantageously, this approach allows faster overall battery system charging during the constant current (CC) period when IBPKI and IBPK2 are significantly different. In one embodiment, additional circuitry for controlling the series FET SR in the above-described manner may be built into an integrated circuit of AFE 306 without significant cost. As shown, comparator circuitry 402 may be coupled across RS1 to automatically control the FET to limit current to a predetermined level. Besides a series FET SR, it will be understood that any other alternative form of series controllable impedance element or other type of current control circuit element/s may be employed that is suitable for controlling cell string charging current iBPK1, for example, such as bipolar junction transistors (BJTs) and/or insulated gate bipolar transistors (IGPBTs), etc.

It will be understood that the embodiments of FIG. 3 and FIG. 4 are exemplary only, and that any other alternative configuration may be employed that is suitable for simultaneously charging two or more cell strings of a hybrid battery system from a shared input current path to the battery system. In this regard, input common charging current iCHG may be limited to the smallest maximum allowable charging current value of the multiple cell strings of the battery system in any fashion that is suitable for controlling input current to a battery system from a coupled battery charger/power circuit. Alternatively, input charging current iCHG may be provided as the greater of the maximum allowable charging currents of two or more cell strings of a hybrid battery system and then current supplied through respective branch current paths to individual cell strings individually controlled in any suitable manner so as not to exceed the maximum allowable current for each of the individual cell strings of the hybrid battery system. Furthermore, it will be understood that particular illustrated components (e.g., such as charge and discharge FETs SC and SD, protective current circuitry, fuses F1, etc.) are optional, and that the particular configurations thereof in the embodiments of FIGS. 3 and 4 are exemplary only.

The disclosed systems and methods may be advantageously implemented with a variety of rechargeable battery cell technologies and combinations thereof, e.g., including, but not limited to, Li-ion battery cells, NiMH battery cells, nickel cadmium (NiCd) battery cells, lithium-polymer (Li-polymer) battery cells, etc. It will be understood that the functions of battery system control logic and control circuitry (e.g., BMU circuitry, AFE circuitry and/or protective current circuitry) described herein may be implemented using any circuit and/or control logic configuration suitable for performing the tasks thereof. For example, in one embodiment, one or more features of a BMU may be implemented using a controller (e.g., processor and associated firmware) that is integral to the battery pack system or using any other suitable configuration of microcontroller/microprocessor, firmware and/or software that interfaces with battery pack system circuitry/components. Furthermore, it will be understood that the herein-described tasks of BMU circuitry, AFE circuitry and/or protective current circuitry may be performed by a single integrated component or by two or more separate components.

In one embodiment, the disclosed systems and methods may be implemented for charging batteries of a portable information handling system, such as notebook computer. Besides notebook computers, other examples of such portable electronic devices include, but are not limited to, portable telephone devices (e.g., cellular phones, cordless phones, etc.), personal digital assistant ("PDA") devices, MP3 players, cameras, medical devices, computer peripherals, etc. In addition to portable electronic devices, it will be understood that the disclosed systems and methods may be implemented to power any other type of electronic device or system load that is at least partially battery powered and that has electronic circuitry that is coupled to receive current from a battery system. In this regard, the disclosed systems and methods may be advantageously implemented in portable or non-portable (e.g., server backup battery) system applications where smart batteries are employed. In one exemplary embodiment, battery pack systems 300 and 400 may be configured as a smart battery system for a portable information handling system. However, it will be understood that the disclosed systems and methods may be also be implemented to control charging operations for dumb battery systems (i.e., battery systems configured to be controlled externally rather than internally).

Figure 5:
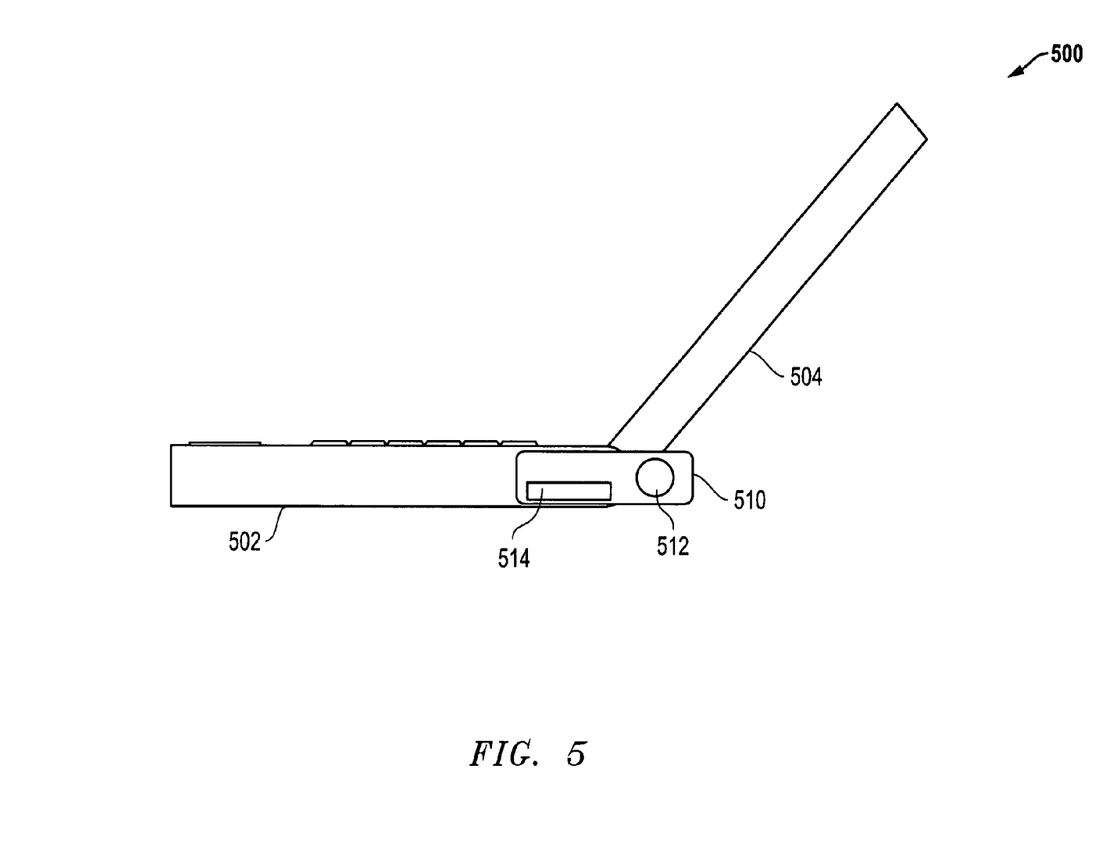
FIG. 5 illustrates a cut-away side view of a portable information handling system according to one exemplary embodiment of the disclosed systems and methods.

Examples of multiple battery cell strings contained in a common battery pack system that have different capacity and impedance include battery cell strings having differing number of battery cells of the same size and/or cell shape from other battery cell strings of the same battery pack system, battery cell strings having different size and/or shape of battery cells from other battery cell strings of the same battery pack system, battery cell strings having differing battery cell chemistry from other battery cell strings of the same battery pack system, or any combination thereof. For example, FIG. 5 illustrates a cut-away side view of a portable information handling system provided in the form of a notebook computer 500 having a lid component 504 and a base component 502 that are hingeably coupled together. As shown, an insertable hybrid battery pack system 510 is removably retained in a battery pack cavity of base 502 of the notebook computer 500. Hybrid battery system 510 includes a first battery cell string 514 made up of flat-shaped (e.g., polymer or prismatic) battery cells contained in a portion of battery pack system 510 that is positioned within base 502, and a second battery cell string 512 is made up of cylindrical-shaped battery cells contained in a portion of battery pack system 510 that extends outside base 502 as shown. Due to difference in geometry and size, first and second battery cell string strings 512 and 514 have different capacities and impedance, and are one example of a configuration of multiple battery cell strings that may be charged together using the circuitry and methodology of the disclosed systems and methods.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of charging a hybrid battery system, comprising:
providing a hybrid battery system comprising at least two battery system terminals and two or more battery cell strings having respective separate and different current paths coupled together in parallel between the battery system terminals with a shared input current path to each of the respective separate and different current paths, the battery cell strings having at least one of different capacity or different impedance characteristics relative to each other and different values of maximum allowable charging current relative to each other; and
applying a charging current to the battery system terminals to simultaneously charge the two or more battery cell strings with respective individual battery cell string currents through each of the respective separate and different current paths that do not exceed the maximum allowable charging current for either of the two or more battery cell strings, the charging current being applied through the shared current path to the respective separate and different current path of each of the given battery cell strings to charge the given battery cell string without individually controlling the individual battery cell string currents in the respective separate and different current paths.

2. The method of claim 1, further comprising applying the charging current to the battery system terminals to simultaneously charge the two or more battery cell strings with respective individual battery cell string currents through each of the respective separate and different current paths that are equal to each other and that are equal to the received charging current, the received charging current being less than or equal to the smaller of the maximum allowable charging current values of the respective battery cell strings such that the current applied to each given battery cell string through its corresponding respective separate and different current path remains less than or equal to the maximum allowable charging current of the given battery cell string without individually controlling the battery cell string current in its corresponding respective separate and different current path.

3. A method of charging a hybrid battery system, comprising:
providing a hybrid battery system comprising at least two battery system terminals and two or more battery cell strings having respective separate and different current paths coupled together in parallel between the battery system terminals with a shared input current path to each of the respective separate and different current paths, the battery cell strings having at least one of different capacity or different impedance characteristics relative to each other and different values of maximum allowable charging current relative to each other; and
applying a charging current to the battery system terminals to simultaneously charge the two or more battery cell strings with respective individual battery cell string currents through each of the respective separate and different current paths that do not exceed the maximum allowable charging current for either of the two or more battery cell strings, the charging current being applied through the shared current path to the respective separate and different current path of each of the given battery cell strings to charge the given battery cell string while individually controlling the individual battery cell string current in at least one of the respective separate and different current paths;

wherein the maximum allowable charging current value of a first one of the two or more battery cell strings is greater than the maximum allowable charging current value of a second one of the two or more battery cell strings; wherein the applied charging current in the shared current path is greater than the maximum allowable charging current value of the second one of the two or more battery cell strings; and wherein the method further comprises controlling a second battery cell string charging current supplied to the second battery cell string through the separate and different current path of the second battery cell string so that the second battery cell string charging current does not exceed the maximum allowable charging current value of the second battery cell string while at the same time supplying a first battery cell string charging current to the first battery cell string through the separate and different current path of the first battery cell string that is greater than the second battery cell string charging current and the maximum allowable charging current value of the second battery cell string; where the first battery cell string charging current and the second battery cell string charging current are simultaneously provided to respective battery cells of the first battery cell string and the second battery cell string at the same time such that the respective battery cells of the two or more battery cell strings are simultaneously charged when the applied charging current in the shared current path is greater than the maximum allowable charging current value of the second one of the two or more battery cell strings.

4. The method of claim 3, wherein the applied charging current through the shared current path is substantially equal to the maximum allowable charging current value of the first one of the two or more battery cell strings; and wherein the method further comprises controlling the second battery cell string charging current supplied to the second battery cell string through the separate and different current path of the second battery cell string so that it does not exceed the maximum allowable charging current value of the second battery cell string at the same time as supplying a first battery cell string charging current to the first battery cell string through the separate and different current path of the first battery cell string that is equal to the maximum allowable charging current value of the first battery cell string.

5. The method of claim 1, further comprising providing switching circuitry only in the shared input current path between one of the battery system terminals and each of the two or more battery cell strings, and not in the separate and different current paths of the individual battery cell strings.

6. The method of claim 5, further comprising providing protective fuse circuitry only in the shared input current path between one of the battery system terminals and each of the two or more battery cell strings, and not in the separate and different current paths of the individual battery cell strings.

7. The method of claim 1, wherein said two or more battery cell strings comprise a part of a replaceable battery pack system of an information handling system; and wherein the method further comprises removably coupling the battery system terminals to system side electrical power terminals of the information handling system to allow current to be interchanged between the two or more battery cell strings and other system components of the information handling system, and applying the charging current to the battery system terminals from the system side electrical power terminals of the information handling system.

8. An information handling system, comprising:
a replaceable hybrid battery pack system, the hybrid battery pack system including:
at least two battery system terminals,
two or more battery cell strings having respective separate current paths coupled together in parallel between the battery system terminals with a shared input current path configured to receive a charging current applied to the hybrid battery system and to provide the charging current to each of the respective separate and different current paths, the battery cell strings having at least one of different capacity or different impedance characteristics relative to each other and different values of maximum allowable charging current relative to each other;
wherein the respective separate current paths of the two or more battery cell strings are coupled together in parallel between the battery system terminals by the shared input current path to allow the two or more battery cell strings to be charged simultaneously from a received charging current at respective individual battery cell string currents through each of the respective separate current paths that do not exceed the maximum allowable charging current for either of the two or more battery cell strings,
where no switching circuitry is provided in the separate current path of any of the two or more battery cell strings;
system side electrical power terminals removably coupled to the battery system terminals to allow current to be interchanged between the two or more battery cell strings and other system components of the information handling system;
a system load coupled to the system side electrical power terminals to receive current from the two or more battery cell strings of the battery system; and
battery charger circuitry coupled to the system side electrical power terminals to provide the charging current to the two or more battery cell strings of the battery system.

9. The information handling system of claim 8, wherein the battery charger circuitry is configured to provide a charging current to the two or more battery cell strings of the hybrid battery pack system that is less than or equal to the smaller of the maximum allowable charging current values of the respective battery cell strings such that the individual battery cell string current applied to each given battery cell string through its corresponding respective separate and different current path remains less than or equal to the maximum allowable charging current of the given battery cell string without individual control of the battery cell string current in its corresponding respective separate and different current path.

10. An information handling system, comprising:
a replaceable hybrid battery pack system, the hybrid battery pack system including:
at least two battery system terminals,
two or more battery cell strings having respective separate current paths coupled together in parallel between the battery system terminals with a shared input current path configured to receive a charging current applied to the hybrid battery system and to provide the charging current to each of the respective separate and different current paths, the battery cell strings having at least one of different capacity or different impedance characteristics relative to each other and different values of maximum allowable charging current relative to each other;

wherein the respective separate current paths of the two or more battery cell strings are coupled together in parallel between the battery system terminals by the shared input current path to allow the two or more battery cell strings to be charged simultaneously from a received charging current at respective individual battery cell string currents through each of the respective separate current paths that do not exceed the maximum allowable charging current for either of the two or more battery cell strings, system side electrical power terminals removably coupled to the battery system terminals to allow current to be interchanged between the two or more battery cell strings and other system components of the information handling system;

a system load coupled to the system side electrical power terminals to receive current from the two or more battery cell strings of the battery system; and battery charger circuitry coupled to the system side electrical power terminals to provide the charging current to the two or more battery cell strings of the battery system;

wherein the maximum allowable charging current value of the first one of the two or more battery cell strings is greater than the maximum allowable charging current value of a second one of the two or more battery cell strings; wherein the battery charger circuitry is configured to provide a charging current through the shared current path to the two or more battery cell strings of the hybrid battery pack system that is greater than the maximum allowable charging current value of the second one of the two or more battery cell strings; and wherein the hybrid battery pack system further comprises a current control circuit element in the separate and different current path of the second one of the two or more battery cell strings, the current control circuit element being configured to control a second battery cell string charging current supplied in the separate and different current path of the second battery cell string so that the second battery cell string charging current does not exceed the maximum allowable charging current value of the second battery cell string at the same time that a first battery cell string charging current supplied in the separate and different current path of the first battery cell string is greater than the second battery cell string charging current and the maximum allowable charging current value of the second battery cell string;

where the current control circuit element is not configured to control the first battery cell string charging current supplied in the separate and different current path of the first battery cell string; and where the hybrid battery pack system is further configured to simultaneously provide the first battery cell string charging current and the second battery cell string charging current to respective battery cells of the first battery cell string and the second battery cell string at the same time such that the respective battery cells of the two or more battery cell strings are simultaneously charged when the applied charging current in the shared current path is greater than the maximum allowable charging current value of the second one of the two or more battery cell strings.

11. The information handling system of claim 10, wherein the battery charger circuitry is configured to provide a charging current through the shared current path to the two or more battery cell strings of the hybrid battery pack system that is substantially equal to the maximum allowable charging current value of the first one of the two or more battery cell strings; and wherein the current control circuit element is configured to control the second battery cell string charging current supplied to the second battery cell string through the separate current path of the second battery cell string so that it does not exceed the maximum allowable charging current value of the second battery cell string at the same time that the first battery cell string charging current supplied to the first battery cell string through the separate and different current path of the first battery cell string is equal to the maximum allowable charging current value of the first battery cell string.

12. The information handling system of claim 8, wherein the hybrid battery pack system further comprises switching circuitry provided only in the shared input current path between one of the hybrid battery pack system terminals and each of the two or more battery cell strings, and not in the separate current paths of the individual battery cell strings.

13. The information handling system of claim 12, wherein the hybrid battery pack system further comprises protective fuse circuitry only in the shared input current path between one of the hybrid battery pack system terminals and each of the two or more battery cell strings, and not in the separate current paths of the individual battery cell strings.

14. A hybrid battery system, comprising:
at least two battery system terminals;
two or more battery cell strings having respective separate current paths coupled together in parallel between the battery system terminals with a shared input current path configured to receive a charging current applied to the hybrid battery system and to provide the charging current to each of the respective separate and different current paths, the battery cell strings having at least one of different capacity or different impedance characteristics relative to each other and different values of maximum allowable charging current relative to each other;
wherein the respective separate current paths of the two or more battery cell strings are coupled together in parallel between the battery system terminals by the shared input current path to allow the two or more battery cell strings to be charged simultaneously from a received charging current at respective individual battery cell string currents through each of the respective separate current paths that do not exceed the maximum allowable charging current for either of the two or more battery cell strings; and
where no switching circuitry is provided in the separate current path of any of the two or more battery cell strings.

15. The system of claim 14, wherein the two or more battery cell strings are coupled together in parallel between the battery system terminals by the shared input current path to allow the two or more battery cell strings to be charged simultaneously from a received charging current at respective individual battery cell string currents that are equal to each other and to the received charging current, the received charging current being less than or equal to the smaller of the maximum allowable charging current values of the respective battery cell strings such that the individual battery cell string current applied to each given battery cell string through its corresponding respective separate and different current path remains less than or equal to the maximum allowable charging current of the given battery cell string without individual control of the battery cell string current in its corresponding respective separate and different current path.

16. A hybrid battery system, comprising:

at least two battery system terminals;

two or more battery cell strings having respective separate current paths coupled together in parallel between the battery system terminals with a shared input current path configured to receive a charging current applied to the hybrid battery system and to provide the charging current to each of the respective separate and different current paths, the battery cell strings having at least one of different capacity or different impedance characteristics relative to each other and different values of maximum allowable charging current relative to each other;

wherein the respective separate current paths of the two or more battery cell strings are coupled together in parallel between the battery system terminals by the shared input current path to allow the two or more battery cell strings to be charged simultaneously from a received charging current at respective individual battery cell string currents through each of the respective separate current paths that do not exceed the maximum allowable charging current for either of the two or more battery cell strings; and a current control circuit element in the separate and different current path of a first one of the two or more battery cell strings; wherein the maximum allowable charging current value of the first one of the two or more battery cell strings is greater than the maximum allowable charging current value of a second one of the two or more battery cell strings; wherein the received charging current is greater than the maximum allowable charging current value of the second one of the two or more battery cell strings; and wherein the current control circuit element is configured to control a second battery cell string charging current supplied in the separate and different current path of the second battery cell string so that it does not exceed the maximum allowable charging current value of the second battery cell string at the same time that a first battery cell string charging current supplied in the separate and different current path of to the first battery cell string is greater than the second battery cell string charging current and the maximum allowable charging current value of the second battery cell string;

where the current control circuit element is not configured to control the first battery cell string charging current supplied in the separate and different current path of the first battery cell string; and where the current control circuit element is not configured to control the first battery cell string charging current supplied in the separate and different current path of the first battery cell string; and where the hybrid battery system is further configured to simultaneously provide the first battery cell string charging current and the second battery cell string charging current to respective battery cells of the first battery cell string and the second battery cell string at the same time such that the respective battery cells of the two or more battery cell strings are simultaneously charged when the applied charging current in the shared current path is greater than the maximum allowable charging current value of the second one of the two or more battery cell strings.

17. The system of claim 16, wherein the received charging current is substantially equal to the maximum allowable charging current value of the first one of the two or more battery cell strings; and wherein the current control circuit element is configured to control the second battery cell string charging current supplied to the second battery cell string through the separate current path of the second battery cell string so that it does not exceed the maximum allowable charging current value of the second battery cell string at the same time that the first battery cell string charging current supplied to the first battery cell string through the separate and different current path of the first battery cell string is equal to the maximum allowable charging current value of the first battery cell string.

18. The system of claim 14, further comprising switching circuitry provided only in the shared input current path between one of the battery system terminals and each of the two or more battery cell strings, and not in the separate current paths of the individual battery cell strings.

19. The system of claim 18, further comprising protective fuse circuitry provided only in the shared input current path between one of the battery system terminals and each of the two or more battery cell strings, and not in the separate current paths of the individual battery cell strings.

20. The system of claim 14, wherein the two or more battery cell strings comprise a part of a replaceable battery pack system of an information handling system; and wherein the battery system terminals are configured to be removably coupled to system side electrical power terminals of the information handling system to allow current to be interchanged between the two or more battery cell strings and other system components of the information handling system.

* * * * *